United States Patent Office 3,202,677
Patented Aug. 24, 1965

3,202,677
ETHERS OF INDOLYL-BENZYL ALCOHOLS
Robert Cornelis Roozemond, Haarlem, North Holland, Netherlands, assignor to N.V. Koninklijke Pharmaceutische Farbrieken v/h Brocades Stheeman en Pharmacia, Amsterdam, Netherlands, a Dutch corporation
No Drawing. Filed Sept. 10, 1963, Ser. No. 307,803
Claims priority, application Great Britain, Sept. 14, 1962, 35,212/62, 35,213/62; Sept. 28, 1962, 36,984/62; Oct. 19, 1962, 39,754/62, 39,756/62
9 Claims. (Cl. 260—319)

This invention relates to new chemical compounds having valuable therapeutic properties and processes and intermediates for the preparation thereof.

The therapeutically active compounds of this invention are bases of the general Formula I:

(I)

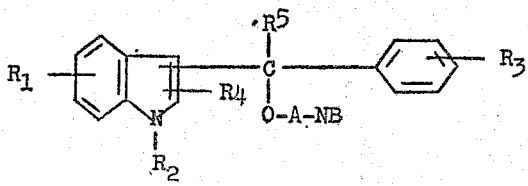

and the acid-addition salts thereof, wherein $R_1$ is hydrogen, halogen, or lower alkoxy; $R_2$ is hydrogen, lower alkyl or monocyclic aryl (lower alkyl); $R_3$ is hydrogen, halogen, trifluoromethyl, lower alkyl, or lower alkoxy; $R_4$ is hydrogen or lower alkyl; $R_5$ is hydrogen or lower alkyl; A is lower alkylene; and NB is a basic nitrogen-containing radical of less than twelve carbon atoms. Among the suitable radicals represented by the symbol NB are: amino; (lower alkyl)amino; di(lower alkyl)amino; (hydroxy-lower alkyl)amino; di(hydroxy-lower alkyl)amino; phenyl-(lower alkyl)amino; N-(lower alkyl)-N-phenyl(lower alkyl)amino; and saturated 5 to 7 membered monocyclic N-heterocyclic radicals of less than twelve carbon atoms, as exemplified by piperidino; (lower alkyl)-piperidino; (lower alkoxy)piperidino; homopiperidino; pyrrolidino; (lower alkyl)-pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino (e.g., $N_4$-methylpiperazino); di(lower alkyl)piperazino; (lower alkoxy)piperazino; $N_4$-(hydroxy-lower alkyl)piperazino; $N_4$-(lower alkanoyloxy-lower alkyl)piperazino; and homopiperazino. The terms "lower alkyl," "lower alkoxy," and "lower alkylene" as employed herein, include both straight and branched chain radicals of less than eight carbon atoms. The particularly preferred compounds are those wherein $R_1$ is hydrogen or lower alkoxy; $R_2$ is methyl; $R_3$ is hydrogen or lower alkyl; $R_4$ is hydrogen; $R_5$ is hydrogen or methyl; A is ethylene, propylene or isopropylene; and NB is mono(lower alkyl)amino or di(lower alkyl)amino.

As to the salts, those coming within the purview of this invention include the acid-addition salts, particularly the non-toxic acid-addition salts. Acids useful for preparing these acid-addition salts include, inter alia, inorganic acids, such as the hydrohalic acids (e.g., hydrochloric and hydrobromic acid), sulfuric acid, nitric acid, boric acid and phosphoric acid, and organic acids, such as oxalic, fumaric, tartaric, citric, acetic, succinic, pamoic and maleic acid.

The compounds of this invention and the acid-addition salts thereof are therapeutically active compounds which possess anti-allergic and sedative activities. Thus, the compounds of this invention can be administered perorally, the dosage for such treatment being adjusted for the activity of the particular compound employed.

The compounds of this invention can be prepared by the process of this invention, the first step of which comprises treating a compound of the general Formula II:

(II)

wherein $R_3$ is as hereinbefore defined, and $R_6$ is lithium or magnesium halide (preferably magnesium bromide and magnesium iodide) with an indolyl aldehyde or ketone of the general Formula III:

(III)

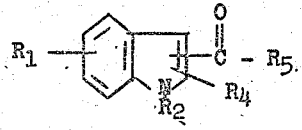

wherein $R_1$, $R_2$, $R_4$ and $R_5$ are as hereinbefore defined and hydrolyzing the complex formed. The reaction is preferably carried out in an inert organic solvent, such as diethyl ether, thereby yielding new intermediates of this invention of the general Formula IV:

(IV)

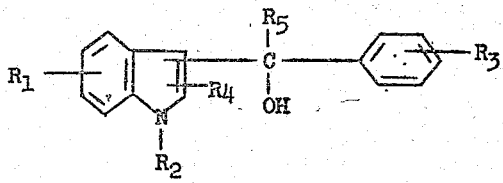

wherein $R_1$, $R_2$, $R_3$, $R_4$ and $R_5$ are as hereinbefore defined.

Among the suitable starting materials of Formula II which can be used may be mentioned: phenyl lithium; (lower alkyl)phenyl lithiums, such as o, m, and p-tolyl lithium, p-ethylphenyl lithium, o-ethylphenyl lithium, o-n-propylphenyl lithium, p-isopropylphenyl lithium, p-n-butylphenyl lithium, and p-n-hexylphenyl lithium; halophenyl lithiums, such as p-chlorophenyl lithium; trifluoromethylphenyl lithiums, such as p-trifluoromethylphenyl lithium; (lower alkoxy)phenyl lithiums, such as o-methoxyphenyl lithium and p-ethoxyphenyl lithium; and the corresponding magnesium bromide and magnesium iodide derivatives thereof.

Among the suitable starting materials of Formula III which can be used may be mentioned: indol-3-yl aldehyde; indol-2-aldehyde; 1-(lower alkyl)-indol-3-yl aldehydes, such as 1-methyl-indol-3-yl aldehyde and 1-ethyl-indol-3-yl-aldehyde; 1-(lower alkyl)-indol-2-yl aldehydes, such as 1-methyl-indol-2-yl aldehyde, 1-ethyl-indol-2-yl aldehyde and 1-isopropyl-indol-2-yl aldehyde; 1-[monocyclic aryl(lower alkyl)]-indol-3-yl aldehydes, particularly 1-[phenyl(lower alkyl)]-indol-3-yl aldehydes, such as 1-benzyl-indol-3-yl aldehyde and 1-phenethyl-indol-3-yl aldehyde; 1-[monocyclic aryl(lower alkyl)]-indol-2-yl aldehydes, particularly 1-[phenyl(lower alkyl)]-indol-2-yl aldehydes, such as 1-benzyl-indol-2-yl aldehyde and 1-phenethyl-indol-2-yl aldehyde; 4,5,6, and 7-halo-indol-3-yl aldehydes, such as 5-chloro-indol-3-yl aldehyde, 6-bromo-indol-3-yl aldehyde and 5-fluoro-indol-3-yl aldehyde; 4,5,6 and 7-halo-indol-2-yl aldehydes, such as 5-chloro-indol-2-yl aldehyde, 6-bromo-indol-2-yl aldehyde and 5-indo-indol-2-yl aldehyde; 4,5,6 and 7-(lower alkoxy)-indol-3-yl aldehydes, such as 5-methoxy-indol-3-yl aldehyde and 6-ethoxy-indol-3-yl aldehyde; 4,5,6 and 7-(lower alkoxy)-indol-2-yl aldehydes, such as 5-methoxy-indol-2- yl aldehyde and 6-isopropoxy-indol-2-yl aldehyde; 4,5,6 and 7-halo-1-(lower alkyl)-indol-3-yl aldehydes, such as 6-chloro-1-methyl-indol-3-yl aldehyde; 4,5,6 and 7-halo-1-(lower alkyl)-indol-2-yl aldehydes, such as 5-chloro-1-methyl-indol-2-yl aldehyle; 4,5,6 and 7-(lower alkoxy)-1-(lower alkyl)-indol-3-yl aldehydes; 4,5,6 and 7-(lower alkoxy)-1-(lower alkyl)-indol-2-yl aldehydes; 2-(lower alkyl)-indol-3-yl aldehydes, such as 2-methyl-indol-3-yl aldehyde; 3-(lower alkyl)-indol-2-yl aldehydes, such as 3-ethyl-indol-2-yl aldehyde; 1,2-di(lower alkyl)-indol-3-yl aldehydes, such as 1,2-dimethyl-indol-3-yl aldehydes; 1,3-di(lower alkyl)-indol-2-yl aldehydes, such as 1-methyl-3-ethyl-indol-2-yl aldehyde; and combinations of any of the above; 3-(lower alkanoyl)indoles, such as 3-acetylindole, 3-propionylindole, 3-butyrylindole, 3-pentanoylindole and 3-hexanoylindole; 2-(lower alkanoyl)-indoles, such as 2-acetylindole, 2-propionylindole, 2-butyrylindole, 2-pentanoylindole and 2-hexanoylindole; 1-(lower alkyl)-3-(lower alkanoyl)indoles, such as 1-methyl-3-acetylindole; 1-(lower alkyl)-2-(lower alkanoyl)-indoles, such as 1-methyl-2-acetylindole; 1-[monocyclic aryl(lower alkyl)]-3-(lower alkanoyl)indoles, such as 1-benzyl-3-acetylindole and 1-phenethyl-3-acetylindole; 1-[monocyclic aryl(lower alkyl)]-2-(lower alkanoyl)indoles, such as 1-benzyl-2-acetylindole; 4,5,6 and 7-halo-2-(lower alkanoyl)indoles; 4,5,6 and 7-halo-3-(lower alkanoyl)indoles; 4,5,6 and 7-(lower alkoxy)-2-(lower alkanoyl)-indoles; 4,5,6 and 7-(lower alkoxy)-3-(lower alkanoyl)indoles; 2-(lower alkyl)-3-(lower alkanoyl)indoles, such as 2-methyl-3-butyryl-indole; 3-(lower alkyl)-2-(lower alkanoyl)indoles, such as 3-methyl-2-acetylindole; 1,2-di(lower alkyl)-3-(lower alkanoyl)indoles, such as 1,2-dimethyl-3-acetylindole; 1,3-di(lower alkyl)-2-(lower alkanoyl)indoles, such as 1,3-dimethyl-2-acetylindole; and combinations of the above.

In those instances where compounds of Formula III are new they can be prepared by reacting a compound of the Formula V:

(V)

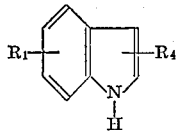

wherein $R_1$ and $R_4$ are as hereinbefore defined, with a dimethyl-lower alkanoyl-amide, such as dimethylformamide and dimethylacetamide, in the presence of phosphorous oxychloride, in the manner known in the art, whereby a compound of Formula III, wherein $R_2$ is hydrogen, is formed, and then if desired alkylating or aralkylating the resulting compound by treatment with a compound of the formula: $R_2X$, wherein $R_2$ is lower alkyl or monocyclic ar(lower alkyl) and X is halogen.

Alternatively, compounds of the Formula IV can be prepared by reacting a compound of the Formula VI:

(VI)

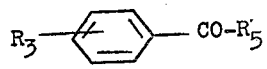

wherein $R_3$ and $R_5$ are as hereinbefore defined, with a compound of the Formula VII:

(VII)

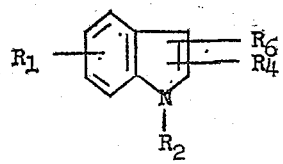

wherein $R_1$, $R_2$, $R_4$ and $R_6$ are as hereinbefore defined, and hydrolyzing the complex formed.

In those instances wherein $R_5$ is other than hydrogen, the compounds of Formula IV can also be prepared by treating a compound of the Formula VIII:

(VIII)

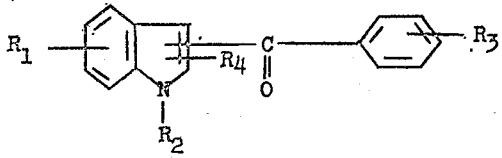

wherein $R_1$, $R_2$, $R_3$ and $R_4$ are as hereinbefore defined, with a compound of the formula: $R_5$—$R_6$ wherein $R_5$ and $R_6$ are as hereinbefore defined, and hydrolyzing the resulting complex.

To prepare the final products of this invention, a compound of the Formula IV is converted to its halide of the general Formula IX:

(IX)

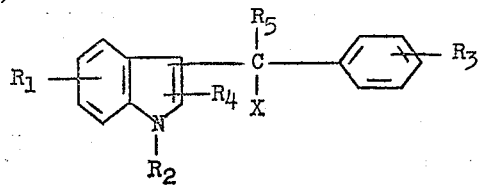

wherein $R_1$, $R_2$, $R_3$, $R_4$ and $R_5$ are as above defined, and X is halogen, preferably chlorine and bromine, by treatment with a halogenating agent, such as thionyl chloride and thionyl bromide; or to an alkali metal salt of the general Formula X:

(X)

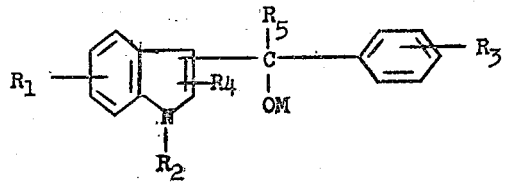

wherein $R_1$, $R_2$, $R_3$, $R_4$ and $R_5$ are as above defined, and M is an alkali metal, preferably sodium, by treatment with an alkali metal hydride or an alkali metal amide, such as sodium hydride.

The final products of this invention of the Formula I can then be prepared either directly by treating with a compound of the formula: BN—A—OM, wherein BN, A and M are as above defined, if a compound of the Formula IX is used, or with a compound of the formula: BN—A—X, wherein BN, A and X are as above defined, if a compound of Formula X is used. The reaction may be carried out in the presence or absence of an inert organic solvent. When a compound of the formula: BN—A—X is used, the reactants are preferably heated in the presence of an acid-binding agent, such as an alkali metal hydride, so as to form the free base of the desired product of the Formula I.

If desired the final products I can also be prepared in two steps from the intermediates of the Formula IX by first treating with an ω-halo(lower alkanol), such as β-chloroethanol to yield new intermediates of this invention of the general Formula XI:

(XI)

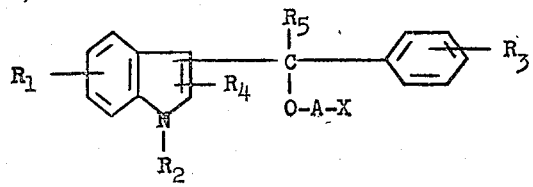

wherein X is halogen, preferably chlorine, and then treating the compound of the Formula XI with a base of the formula BNH, wherein BN is as hereinbefore defined.

Acid-addition salts of the bases of Formula I can be prepared in the conventional manner, by treating the base with an equivalent quantity of the desired acid in an inert solvent.

The following examples illustrate the invention (all temperatures being in centigrade):

EXAMPLE 1

α-(1-methylindol-3-yl)-benzyl alcohol 3 g. of lithium in 10 ml. of anhydrous ether and 31.4 g. of bromobenzene dissolved in 75 ml. of anhydrous ether are reacted in a nitrogen atmosphere to form phenyl-lithium. The mixture is cooled to −15° and 22 g. of 1-methylindol-3-yl aldehyde is added portion-wise with stirring. After warming up to ambient temperature, stirring is continued for another two hours. The mixture is cooled in an ice-salt bath and decomposed with a 15% ammonium chloride solution. The water layer is extracted with an equal volume of ether, and the combined ethereal solution obtained by the extractions is washed with water and dried over sodium sulphate. After filtration, the ether is removed by distillation and the oily residue transformed into solid material by means of scratching and treatment with dichloromethane and petroleum ether (boiling range 28–40°). The crystalline material is filtered off after addition of further amounts of petroleum ether (boiling range 28–40°). The white crystalline solid is purified by crystallization from dichloromethane and petroleum ether. α-(1-methylindol-3-yl)-benzyl alcohol, melting at about 95–97°, is obtained in 97% yield.

Analysis.—Calculated for $C_{16}H_{15}NO$: C, 80.98%; H, 6.37%; N, 5.90%. Found: C, 81.90%; H, 6.3%; N, 5.6%.

EXAMPLE 2

α-(1-methylindol-3-yl)-o-methylbenzyl alcohol

Following the procedure described in Example 1 but substituting an equivalent amount of o-tolylbromide for the bromobenzene, α-(1-methylindol-3-yl)-o-methylbenzyl alcohol is obtained in 96% yield. The compound has a melting point of of about 88.5–89.0°.

EXAMPLE 3

α-(1-methylindol-3-yl)-m-methylbenzyl alcohol

Following the procedure described in Example 1 but substituting an equivalent amount of m-tolylbromide for the bromobenzene, α-(1-methylindol-3-yl)-m-methylbenzyl alcohol, M.P. 65–67°, is obtained in a 96% yield.

EXAMPLE 4

α-(1-methylindol-3-yl)-p-methyl-benzyl alcohol

Following the procedure described in Example 1 but substituting an equivalent amount of p-tolylbromide for the bromobenzene, α-(1-methylindol-3-yl)-p-methyl-benzyl alcohol, M.P. 72–75°, is obtained in a 96% yield.

EXAMPLE 5

α-(1-methyl-α-indol-3-yl)-o-ethylbenzyl alcohol

Following the procedure described in Example 1 but substituting an equivalent amount of 2-ethylbromobenzene for the bromobenzene, α-(1-methyl-α-indol-3-yl)-o-ethylbenzyl alcohol, M.P. 84–85°, is obtained in a 90% yield.

EXAMPLE 6

α-(1-methylindol-2-yl)-α-methylbenzyl alcohol

From 6.3 g. of bromobenzene dissolved in ether, and 500 mg. of lithium, phenyl-lithium is prepared under a nitrogen atmosphere. The mixture is chilled in an ice-salt bath and 6.1 g. of 1-methyl-2-acetylindole dissolved in 50 ml. of anhydrous ether is added dropwise with stirring. After completion of the addition, the mixture is stirred for another hour at ambient temperature. After cooling, the mixture is decomposed by addition of a 15% ammonium chloride solution. The aqueous layer is separated and extracted with ether. The combined ethereal solutions are washed with water and dried with sodium sulphate. After filtration, the solvent is distilled off, leaving a residue which is brought to crystallization by addition of a little petroleum ether (boiling range 28–40°). The crystalline material is filtered off and washed with petroleum ether (boiling range 28–40°). α-(1-methylindol-2-yl)-α-methylbenzyl alcohol is isolated in 83% yield. Melting point 100–100.5°.

Analysis.—Calculated for $C_{17}H_{17}ON$: C, 81.24%; H, 6.82%; N, 5.57%. Found: C, 81.2%; H, 6.7%; N, 5.6%.

EXAMPLE 7

α-(1-methylindol-2-yl)-α-methyl-2'-methylbenzyl alcohol

From a mixture of o-tolyl-lithium and 1-methyl-2-acetylindole dissolved in ether, α-(1-methylindol-2-yl)-α-methyl-2'-methylbenzyl alcohol is prepared according to the procedure described in Example 6. After crystallization from a little petroleum ether (boiling range 28–40°), the product, which melts at 72–74°, is obtained in 60% yield.

EXAMPLE 8

α-(1-methylindol-2-yl)-α-methyl-4'-methylbenzyl alcohol

From a mixture of p-tolyl-lithium and 1-methyl-2-acetyl-indole dissolved in ether, α-(1-methylindol-2-yl)-α-methyl-4'-methylbenzyl alcohol is prepared according to the procedure described in Example 6. Yield 78%. Melting point 84–85°.

Similarly, by following the procedure of Example 1 but substituting the indicated Z-substituted-bromobenzene for the bromobenzene, the indicated α-(1-methylindol-3-yl)-Z-substituted-benzyl alcohol is formed:

| Example | Z-substituted-bromobenzene | Z-substituted product |
|---|---|---|
| 9 | p-Chloro | p-Chloro. |
| 10 | o-Bromo | o-Bromo. |
| 11 | p-Trifluoromethyl | p-Trifluoromethyl. |
| 12 | m-Methoxy | m-Methoxy. |
| 13 | p-Ethoxy | p-Ethoxy. |

Moreover, following the procedure of Example 1 but substituting the indicated Z-substituted indol-3-yl aldehyde for the 1-methylindol-3-yl aldehyde, the indicated α-(Z-substituted-indol-3-yl)-benzyl alcohol is formed:

| Example | Z-substituted-indol-3-yl aldehyde | Z-substituted product |
|---|---|---|
| 14 | 1-hydrogen | 1-hydrogen. |
| 15 | 1-benzyl | 1-benzyl. |
| 16 | 1,2-dimethyl | 1,2-dimethyl. |
| 17 | 1-methyl-2-ethyl | 1-methyl-2-ethyl. |
| 18 | 1-methyl-6-chloro | 1-methyl-6-chloro. |
| 19 | 1-methyl-5-methoxy | 1-methyl-5-methoxy. |
| 20 | 1,2-dimethyl-7-ethoxy | 1,2-dimethyl-7-ethoxy. |
| 21 | α,1-diethyl | α,1-diethyl. |
| 22 | α-Ethyl | α-Ethyl. |

EXAMPLE 23

N,N-dimethyl-2-[α-(1-methylindol-3-yl)-benzyloxy]ethylamine 14.2 g. of α-(1-methylindol-3-yl)-benzyl alcohol is dissolved in 120 ml. of anhydrous toluene. Then 10 ml. of toluene is removed by distillation in order to remove the last traces of water. After cooling to ambient temperature 3.2 g. of a 50% suspension of sodium hydride in oil is added and the mixture is heated to a temperature of about 100° with stirring. After three hours the mixture is cooled to about 50° and 11 g. of freshly prepared β-dimethylaminoethyl chloride are added. Stirring is continued for 14 hours at a temperature of 100°. After cooling, about 50 ml. of water are added. The organic layer is separated and the aqueous layer extracted with ether. The combined organic solutions are washed with water and dried over potassium carbonate. The solvents and residual β-dimethylaminoethylchloride are removed by distillation leaving an oil, mainly consisting of crude N,N-dimethyl-2-[α-(1-methyl-indol - 3 - yl)-benzyloxy]-ethylamine. The ether is purified via its reineckate, M.P. about 156–157° C. (with decomposition). The free base is obtained in 63% yield.

*Analysis of the reineckate.*—Calculated for $C_{24}H_{31}N_8OS_4Cr$: C, 45.96%; H, 4.98%; N, 17.81%

Found: C, 46.6%; H, 4.9%; N, 18.1%.

EXAMPLE 24

*N,N-dimethyl-2-[α-(1-methylindol-3-yl)-o-methylbenzyloxy]ethylamine*

Following the procedure of Example 23 but substituting an equivalent amount of α-(1-methylindol-3-yl)-o-methylbenzyl alcohol for the α-(1-methylindol-3-yl)-benzyl alcohol, N,N-dimethyl-2-[α-(1-methylindol-3-yl)-o-methylbenzyloxy]-ethylamine is prepared. Yield 62%. Melting point of the reineckate 155°–156° (decomposition).

EXAMPLE 25

*N,N-dimethyl-2-[α-(1-methylindol-3-yl)-p-methylbenzyloxy]ethylamine*

Following the procedure of Example 23 but substituting an equivalent amount of α-(1-methylindol-3-yl)-p-methylbenzyl alcohol for the α-(1-methylindol-3-yl)-benzyl alcohol, N,N-dimethyl-2-[α-(1-methylindol-3-yl)-p-methylbenzyloxy]-ethylamine is prepared. Yield 62%.

EXAMPLE 26

*N,N-dimethyl-2-[α-(1-methylindol-3-yl)-o-ethylbenzyloxy]ethylamine*

Following the procedure of Example 23 but substituting an equivalent amount of α-(1-methylindol-3-yl)-o-ethylbenzyl alcohol for the α-(1-methylindol-3-yl)-benzyl alcohol, N,N-dimethyl-2-[α-(1-methylindol-3-yl)-o-ethylbenzyloxy]-ethylamine is prepared. Yield 61%.

EXAMPLE 27

*N,N,-dimethyl-2-[α-(1-methylindol-2-yl)-4'-chlorobenzyloxy]ethylamine oxalate*

2.7 g. of α-(1-methylindol-2-yl)-4'-chlorobenzyl alcohol (prepared according to the method described by D. A. Shirley and P. A. Roussel, J. Am. Chem. Soc. 75, 375 (1953) is dissolved in 25 ml. of anhydrous toluene. Then about 2 ml. of toluene is distilled off in order to remove the last traces of water. After cooling to ambient temperature, 510 mg. of a 50% suspension of sodium hydride in oil is added and the mixture is heated to a temperature of about 60° with stirring. The mixture is kept at 60° for 2½ hours with stirring meanwhile. Then 3.2 g. of freshly prepared β-dimethylaminoethylchloride is added and the mixture is stirred at 100° for 14 hours. The mixture is cooled and treated with water. After separation, the aqueous layer is extracted with ether and the combined toluene and ether layers are washed with water and dried over potassium carbonate. The solvents and residual β-dimethylaminoethylchloride are removed by distillation leaving an oil, which is dissolved in 100 ml. of ether. A solution of oxalic acid is added with stirring until the mixture reacts slightly acid. The precipitate is filtered off and washed with ether. N,N-dimethyl-2-[α-(1-methylindol-2-yl)-4' - chlorobenzyloxy] - ethylamine oxalate thus obtained is purified by crystallization from ethanol or from a mixture of ethanol and ether. Yield 93%. Melting point 143.0–143.5°.

*Analysis.*—Calculated for $C_{22}H_{25}O_5N_2Cl$: C, 61.03%; H, 5.82%; N, 6.47%. Found: C, 61.3%; H, 6.3%; N, 6.6%.

EXAMPLE 28

*N,N-dimethyl-2-[α-(1-methylindol-2-yl)-benzyloxy]-ethylamine oxalate*

Following the procedure of Example 27 but substituting an equivalent amount of α-(1-methylindol-2-yl)-benzyl alcohol for the α-(1-methylindol-2-yl)-4'-chlorobenzyl alcohol, N,N-dimethyl-2-[α(1-methylindol-2-yl)-benzyloxy]-ethylamine oxalate is prepared. Yield 95%. Melting point 136.0–136.6° after crystallization from ethanol.

The α-(1-methylindol-2-yl)-benzyl alcohol is prepared as follows:

3 g. of lithium in 10 ml. of anhydrous ether and 31.4 g. of bromobenzene dissolved in 75 ml. of anhydrous ether are reacted in a nitrogen atmosphere to form phenyl lithium. The mixture is cooled to 15° and 22 g. of 1-methylindol-2-yl aldehyde are added portion-wise with stirring. After warming up to ambient temperature, stirring is continued for another two hours. The mixture is cooled in an ice-salt bath and decomposed with a 15% ammonium chloride solution. The water layer is extracted with an equal volume of ether and the combined ethereal solution obtained by the extractions is washed with water and dried over sodium sulphate. After filtration, the ether is removed by distillation. The oily residue crystallizes on standing. The α-(1-methylindol-2-yl)-benzyl alcohol thus obtained melts at 78.5–79.5°, after crystallization from petroleum ether (boiling range 60–80°). Yield 67%.

Calculated for $C_{16}H_{15}NO$: C, 80.98%; H, 6.37%; N, 5.90%. Found: C, 80.81%; H, 6.34%; N, 5.99%.

EXAMPLE 29

*N,N-dimethyl-2-[α-(1-methylindol-2-yl)-α-methylbenzyloxy]ethylamine*

4.3 g. of α-(1-methylindol-2-yl)-α-methylbenzyl alcohol is dissolved in 35 ml. of anhydrous toluene. Then about 3 ml. of toluene is distilled off in order to remove the last traces of water. After cooling to a temperature of 60°, 1.0 g. of a 50% suspension of sodium hydride in oil in added and the mixture gradually heated. At about 90° a vigorous reaction takes place. The mixture is kept at 100° for one hour with stirring meanwhile. After cooling, 5.4 g. of freshly prepared β-dimethylaminoethyl chloride is added and the mixture is stirred at 100° for 14 hours. The mixture is cooled and treated with water. After separation, the aqueous layer is extracted with ether and the combined toluene and ether layers are washed with water and dried with potassium carbonate. A small quantity of activated carbon is added. After filtration, the solvents and residual β-dimethylaminoethyl chloride are removed by distillation (the last traces by a distillation under reduced pressure) leaving a residue, which is dissolved in about 200 ml. of ether. A solution of oxalic acid is added with stirring until the mixture reacts slightly acid. The precipitate is filtered off and washed with ether. N,N-dimethyl-2-[α-(1-methylindol-2-yl)-α-methylbenzyloxy]-ethylamine oxalate thus obtained is purified by crystallization from ethanol or from a mixture of ethanol and ether. Yield 85%. Melting point 157°. Melting point of the free base 84–86°.

*Analysis.*—Calculated for $C_{23}H_{28}N_2O_5$: C, 66.97%; H, 6.84%; N, 6.79%. Found: C, 67.1%; H, 6.8%; N, 6.9%.

EXAMPLE 30

*N,N-dimethyl-2-[α-(1-methyindol-2-yl)-α-methyl-2'-methylbenzyloxy]-ethylamine oxalate*

Following the procedure of Example 29 but substituting an equivalent amount of α-(1-methylindol-2-yl)-α-methyl-2'-methylbenzyl alcohol for the α-(1-methylindol-2-yl)-α-methylbenzyl alcohol, N,N-dimethyl-2-[α-(1-methylindol-2-yl)-α-methyl-2'-methylbenzyloxy]ethylamine oxalate is prepared. Yield 85%. Melting point 153.5–154°.

*Analysis.*—Calculated for $C_{24}H_{30}O_5N_2$: C, 67.58%; H, 7.09%; N, 6.57%. Found: C, 67.1%; H, 7.0%; N, 6.7%.

EXAMPLE 31

*N,N-dimethyl-2-[α-(1-methylindol-2-yl)-α-methyl-4'-methylbenzyloxy]-ethylamine oxalate*

Following the procedure of Example 29 but substituting an equivalent amount of α-(1-methylindol-2-yl)-α-methyl-4'-methylbenzyl alcohol for the α-(1-methylindol-2-yl)-α-methylbenzyl alcohol, N,N-dimethyl-2-[α-(1-methylindol-2-yl)-α-methyl-4' - methylbenzyloxy] - ethylamine oxalate is prepared. Yield 90%. Melting point 157–157.5°.

*Analysis.*—Calculated for $H_{24}H_{30}O_5N_2$: C, 67.58%; H, 7.09%; N, 6.57%. Found: C, 67.40%; H, 6.93%; N, 6.61%.

Similarly, by following the procedure of Example 23 but substituting the indicated amino(lower alkyl) chloride for the β-dimethylaminoethyl chloride, the indicated ω-[α-(1-methylindol-3-yl)benzyloxy](lower alkyl)amine is formed:

| Example | Amino (lower alkyl) chloride | (Lower alkyl)amine |
|---|---|---|
| 32 | 2-diethylaminoethyl | N,N-Diethyl-ethylamine. |
| 33 | 3-dimethylaminopropyl | N,N-Dimethyl-propylamine. |
| 34 | 2-piperidinoethyl | N-Pentylene-ethylamine. |
| 35 | 2-piperazinoethyl | N-3-azapentylene-ethylamine. |
| 36 | 3-morpholinopropyl | N-3-oxapentylene-propylamine. |
| 37 | 2-methylaminopropyl | N-Methyl-1-methylethyl. |
| 38 | 2-[N⁴-(acetoxyethyl)piperazino]ethyl. | N-3-(acetoxyethylaza)-pentylene-ethylamine. |

Moreover, following the procedure of Example 23 but substituting the indicated α-(Z-substituted-indol-3-yl)-benzyl alcohol for the α-(1-methylindol-3-yl)-benzyl alcohol, the indicated N,N-dimethyl-2-[α-(Z-substituted-indol-3-yl)-benzyloxy]ethylamine is obtained:

| Example | α-(Z-substituted-indol-3-yl)-benzyl alcohol | Z-substituted product |
|---|---|---|
| 39 | 1-hydrogen | 1-hydrogen. |
| 40 | 1-benzyl | 1-benzyl. |
| 41 | 1,2-dimethyl | 1,2-dimethyl. |
| 42 | 1-methyl-2-ethyl | 1-methyl-2-ethyl. |
| 43 | 1-methyl-6-chloro | 1-methyl-6-chloro. |
| 44 | 1-methyl-5-methoxy | 1-methyl-5-methoxy. |
| 45 | 1,2-dimethyl-7-ethoxy | 1,2-dimethyl-7-ethoxy. |
| 46 | α, 1-diethyl | α, 1-diethyl. |
| 47 | α-Ethyl | α-Ethyl. |

Finally, following the procedure of Example 23 but substituting the indicated α - (1-methylindol-3-yl)-Z'-substituted-benzyl alcohol for the α-(1-methylindol-3-yl)-benzyl alcohol, the indicated N,N-dimethyl-2-[α-(1-methylindol - 3 - yl) - Z' - substituted-benzyloxy]ethylamine is formed:

| Example | α-(1-methylindol-3-yl)-Z¹-substituted-benzyl alcohol | Z-substituted product |
|---|---|---|
| 48 | 0-Bromo | 0-Bromo. |
| 49 | p-Trifluoromethyl | p-Trifluoromethyl. |
| 50 | m-Methoxy | m-Methoxy. |
| 51 | p-Ethoxy | p-Ethoxy. |

EXAMPLE 52

*α-(1-methylindol-2-yl)-α-methyl-3'-methyl-benzyl alcohol*

From a mixture of m-tolyl-lithium and 1-methyl-2-acetyl indole dissolved in ether, α-(1-methylindol-2-yl)-α-methyl-3'-methyl-benzyl alcohol is prepared according to the procedure described in Example 1. The desired product is obtained in the form of a pale yellow oil which withstands all efforts to induce crystallization. The yield is nearly quantitative but the product is impure. It can be used for the preparation of amino-ethers without further purification, however.

EXAMPLE 53

*N,N-dimethyl-2-[α-(1-methylindol-3-yl)-m-methylbenzyloxy]ethylamine*

Following the procedure of Example 23 but substituting an equivalent amount of α-(1-methylindol-3-yl)-m-methyl benzyl-alcohol for the α-(1-methylindol-3-yl) benzyl alcohol, N,N-dimethyl-2-[α-(1-methylindol-3-yl)-m-methylbenzyloxy]-ethylamine is prepared. Yield 54%.

EXAMPLE 54

*α-(1-methylindol-2-yl)-o-methylbenzyl alcohol*

Following the procedure of Example 28, but substituting an equivalent amount of o-bromotoluene for the bromobenzene, α-(1-methylindol-2-yl)-o-methylbenzyl alcohol is prepared. Yield of the crude product 85%. It is used without purification for further syntheses.

EXAMPLE 55

*α-(1-methylindol-2-yl)-m-methylbenzyl alcohol*

Following the procedure of Example 28 but substituting an equivalent amount of m-bromotoluene for the bromobenzene, α - (1 - methylindol-2-yl)-m-methylbenzyl alcohol is prepared. Yield of the crude product 82%. It is used without purification, for further syntheses.

EXAMPLE 56

*α-(1-methylindol-2-yl)-p-methylbenzyl alcohol*

Following the procedure of Example 28 but substituting an equivalent amount of p-bromotoluene for the bromobenzene, α-(1-methylindol-2-yl)-p-methylbenzyl alcohol is prepared. Yield of the crude product 89%. It is used without purification for further syntheses.

EXAMPLE 57

*N,N-dimethyl-2-[α-(1-methylindol-2-yl)-2'-methylbenzyloxy]ethylamine oxalate*

Following the procedure of Example 27 but substituting an equivalent amount of α-(1-methylindol-2-yl)-2'-methylbenzyl alcohol for the α-(1-methylindol-2-yl)-4'-chlorobenzyl alcohol, N,N-dimethyl-2-[α-(1-methylindol-2-yl)-2'-methylbenzyloxy]ethylamine oxalate is prepared. Yield 73%. Melting point 117–119° after crystallization from a mixture of ethanol and diethyl ether.

EXAMPLE 58

*N,N-dimethyl-2-[α-(1-methylindol-2-yl)-3'-methylbenzyloxy]ethylamine oxalate*

Following the procedure of Example 27 but substituting an equivalent amount of α-(1-methylindol-2-yl)-3'-methylbenzyl alcohol for the α-(1-methylindol-2-yl)-4'-chlorobenzyl alcohol, N,N-dimethyl-2-[α-(1methylindol-2-yl)-3'-methylbenzyloxy]ethylamine oxalate is prepared. Yield 92%. Melting point 108–110° after crystallization from a mixture of ethanol and diethylether.

EXAMPLE 59

*N,N-dimethyl-2-[α-(1-methylindol-2-yl)-4'-methylbenzyloxy]ethylamine oxalate*

Following the procedure of Example 27 but substituting an equivalent amount of α-(1-methylindol-2-yl)-4'-methylbenzyl alcohol for the α-(1-methylindol-2-yl)-4'-chlorobenzylalcohol, N,N - dimethyl-2-[α-(1-methylindol-2-yl)-4'-methylbenzyloxy] ethylamine oxalate is prepared. Yield 89%. Melting point 91.5–93° after crystallization from a mixture of ethanol and diethyl ether.

The invention includes within its scope pharaceutical preparations containing one or more of the therapeutically active compounds of Formula I, or non-toxic acid addition salts thereof, in association with a pharmacologically acceptable carrier. The preparation may take any of the forms customarily employed for administration of therapeutically active substances, but the preferred types are those suitable for oral administration and especially tablets, pills and capsules including the substance. The tablets and pills may be formulated in manner known per se with one or more pharmacologically acceptable diluents or excipients such as lactose or starch, and include materials of a lubricating nature such as calcium stearate. Capsules made of absorbable material, such as gelatin, may contain the active substance alone or in admixture with a solid or liquid diluent. Liquid preparations may be in the form of suspensions, emulsions, syrups or elixirs of the active substance in water or other liquid medium commonly used for making orally acceptable pharmaceutical formulations, such as liquid paraffin, or a syrup or elixir base. The active substance may also be made up in a form suitable for parenteral administration, i.e., as a suspension or emulsion in sterile water or an organic liquid usually employed for injectable preparations, for example vegetable oil such as olive oil, or a sterile solution in an organic solvent.

What is claimed is:
1. A compound selected from the group consisting of bases of the formula

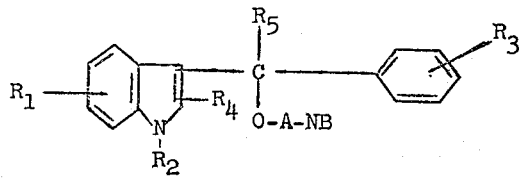

and non-toxic acid-addition salts thereof, wherein $R_1$ is selected from the group consisting of hydrogen, halogen, and lower alkoxy, $R_2$ is selected from the group consisting of hydrogen, lower alkyl and phenyl (lower alkyl), $R_3$ is selected from the group consisting of hydrogen, halogen, trifluoromethyl, lower alkyl and lower alkoxy, $R_4$ is selected from the group consisting of hydrogen and lower alkyl, $R_5$ is selected from the group consisting of hydrogen and lower alkyl, A is lower alkylene and NB is a basic nitrogen-containing radical selected from the group consisting of mono(lower alkyl)amino, di(lower alkyl)amino, piperidino, piperazino, morpholino and $N^4$-(lower alkanoyloxy)piperazino.

2. N,N-di(lower alkyl)-ω-[α-(1-lower alkyl-indol-3-yl)-benzyloxy](lower alkyl) amine.

3. N,N-dimethyl-2-[α-(1-methylindol-3-yl)-benzyloxy]-ethylamine.

4. N,N-di(lower alkyl)-ω-[α-(1-lower alkyl-indol-2-yl)-benzyloxy](lower alkyl)amine.

5. N,N - dimethyl - 2-[α-(1-methylindol-2-yl)-benzyloxy]ethylamine.

6. N,N-di(lower alkyl)-ω-[α-(1-lower alkyl-indol-2-yl)-halo-benzyloxy](lower alkyl)amine.

7. N,N - dimethyl - 2 - [α-(1-methylindol-2-yl)-4'-chlorobenzyloxy]ethylamine.

8. N,N-di(lower alkyl)-ω-[α-(1-lower alkyl-indol-2-yl)-α-(lower alkyl)benzyloxy](lower alkyl)amine.

9. N,N - dimethyl - 2 - [α-(1-methylindol-2-yl)-α-methylbenzyloxy]ethylamine.

References Cited by the Examiner
UNITED STATES PATENTS 3,010,971  11/61  Kaiser et al. _____ 260—319

OTHER REFERENCES

Chem. Abstracts, vol. 23, 1929, page 1635[7], Call No. QD1–A5, Abstract of Hadano, Jour. Pharm. Soc., Japan, vol. 48, pages 919–928 (1928).

Hackh's Chem. Dictionary, 3rd edition, edited by Grant, The Blakiston Co., Phil., 1944, page 119.

NICHOLAS R. RIZZO, *Primary Examiner.*